(12) United States Patent
Tang et al.

(10) Patent No.: US 11,006,402 B2
(45) Date of Patent: May 11, 2021

(54) METHOD FOR TRANSMITTING INFORMATION, NETWORK DEVICE AND TERMINAL DEVICE

(71) Applicant: GUANGDONG OPPO MOBILE TELECOMMUNICATIONS CORP., LTD., Guangdong (CN)

(72) Inventors: Hai Tang, Dongguan (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 24 days.

(21) Appl. No.: 16/466,400

(22) PCT Filed: Dec. 19, 2016

(86) PCT No.: PCT/CN2016/110753
§ 371 (c)(1),
(2) Date: Jun. 4, 2019

(87) PCT Pub. No.: WO2018/112700
PCT Pub. Date: Jun. 28, 2018

(65) Prior Publication Data
US 2020/0077368 A1    Mar. 5, 2020

(51) Int. Cl.
*H04W 72/04* (2009.01)
*H04L 5/00* (2006.01)

(52) U.S. Cl.
CPC ......... *H04W 72/042* (2013.01); *H04L 5/0007* (2013.01); *H04W 72/044* (2013.01)

(58) Field of Classification Search
None
See application file for complete search history.

(56) References Cited

U.S. PATENT DOCUMENTS

2014/0321399 A1    10/2014  Liu et al.
2015/0023290 A1*    1/2015  Tang ................... H04W 72/042
                                                         370/329
(Continued)

FOREIGN PATENT DOCUMENTS

CN    101094214 A    12/2007
CN    101854638 A    10/2010
(Continued)

OTHER PUBLICATIONS

First Office Action of the Canadian application No. 3046405, dated Jul. 8, 2020.

(Continued)

*Primary Examiner* — Eunsook Choi
(74) *Attorney, Agent, or Firm* — Ladas & Parry, LLP

(57) ABSTRACT

Provided is a method for transmitting information, a network device and a terminal device. The method includes that: a time-frequency resource for a downlink control channel of at least one terminal device is determined, the time-frequency resource for the downlink control channel of the at least one terminal device being mapped in a first control region within a bandwidth of a system according to a manner of a frequency domain first and then a time domain; and the downlink control channel of the at least one terminal device is sent through the time-frequency resource for the downlink control channel of the at least one terminal device. According to the information transmission method, network device and terminal device of the embodiments of the application, system performance may be improved.

20 Claims, 7 Drawing Sheets

(56) References Cited

U.S. PATENT DOCUMENTS

| | | | |
|---|---|---|---|
| 2015/0304146 A1 | 10/2015 | Yang et al. | |
| 2016/0323859 A1 | 11/2016 | Liu et al. | |
| 2019/0230696 A1* | 7/2019 | Kim | H04L 5/0053 |
| 2019/0260524 A1* | 8/2019 | Nam | H04L 1/0045 |
| 2020/0177306 A1* | 6/2020 | Choi | H04L 5/0094 |
| 2020/0178231 A1* | 6/2020 | Zhang | H04L 5/0044 |
| 2020/0205134 A1* | 6/2020 | Pan | H04L 5/0053 |
| 2020/0214014 A1* | 7/2020 | Wang | H04W 72/042 |

FOREIGN PATENT DOCUMENTS

| | | |
|---|---|---|
| CN | 102256358 A | 11/2011 |
| CN | 103095355 A | 5/2013 |
| CN | 103200684 A | 7/2013 |
| CN | 103312481 A | 9/2013 |
| CN | 102036388 B | 10/2013 |
| CN | 104253682 A | 12/2014 |
| CN | 104823402 A | 8/2015 |
| CN | 105490796 A | 4/2016 |
| CN | 106160969 A | 11/2016 |
| EP | 2884710 A1 | 6/2015 |
| JP | 2015508603 A | 3/2015 |
| JP | 2015213371 A | 11/2015 |
| JP | 2016508684 A | 3/2016 |
| RU | 2549365 C2 | 4/2015 |
| WO | 2016004560 A1 | 1/2016 |

OTHER PUBLICATIONS

Third Office Action of the Chinese application No. 201680091694.1, dated Jul. 24, 2020.
"Summary of offline discussion on DL control channels" TSG-RAN WG1 #87 R1-1613720; Nov. 18, 2016.
"Summary of e-mail discussions on downlink control signaling" TSG-RAN WG1 #87 R1-1612908; Reno, NV, USA, Nov. 14-18, 2016.
"Summary of offline discussion on DL control channels" TSG-RAN WG1 #87 R1-1613311; Nov. 18, 2016.
First Office Action of the Chinese application No. 201680091694.1, dated Mar. 12, 2020.
Second Office Action of the Chinese application No. 201680091694.1, dated Jun. 1, 2020.
First Office Action of the Chilean application No. 201901693, dated Mar. 19, 2020.
Written Opinion of the Singaporean application No. 11201905312Q, dated May 19, 2020.
First Office Action of the Russian application No. 2019122547, dated May 22, 2020.
Samsung: "DL Control Channel Design", 3GPP Draft; R1-1612524 DL Control, 3rd Generation Partnership Project (3GPP), Mobile Competence Centre; 650, Route Des Lucioles; F-06921 Sophia-Antipolis Cedex; France vol. RAN WG1, No. Reno, USA; Nov. 14, 2016-Nov. 18, 2016; Nov. 13, 2016 (Nov. 13, 2016), XP051176471, * NR DL control channel mapping; mapping at the frequency and time domain; for beamforming.
Huawei Hisi Licon: "Discussion on search space design for DL control channels", 3GPP Draft; R1-1611211, 3rd Generation Partnership Project (3GPP), Mobile Competence Centre; 650, Route Des Lucioles; F-06921 Sophia-Antipolis Cedex; France vol. RAN WG1, No. Reno, USA; Nov. 14, 2016-Nov. 18, 2016; Nov. 13, 2016 (Nov. 13, 2016), XP051175192, * DL search spsace design and addressing; paragraph [0001]—paragraph [0004] *.
Nokia Alcatel-Lucent Shanghai Bell: "On the DL control channel structure for NR", 3GPP Draft; R1-1612235 DL Control Final, 3rd Generation Partnership Project (3GPP), Mobile Competence Centre; 650, Route Des Lucioles; F-06921 Sophia-Antipolis Cedex; France vol. RAN WG1, No. Reno, NV, USA; Nov. 14, 2016-Nov. 18, 2016; Nov. 13, 2016 (Nov. 13, 2016), XP051176184, * NR DL control channel design and configuration; paragraph [0001]—paragraph [0002] *.
Interdigital communications: "DL control channel framework for NR", 3GPP Draft; R1-1610089, 3rd Generation Partnership Project (3GPP), Mobile Competence Centre; 650, Route Des Lucioles; F-06921 Sophia-Antipolis Cedex; France vol. RAN WG1, No. Lisbon, Portugal; Oct. 10, 2016-Oct. 14, 2016; Oct. 1, 2016 (Oct. 1, 2016), XP051159900, * NR control region definition based on time, frequency, beam; paragraph [0001]—paragraph [0003] *.
English translation of the Written Opinion of the International Search Authority in the international application No. PCT/CN2016/110753; dated Sep. 14, 2017.
Supplementary European Search Report in the European application No. 16924661.8, dated Oct. 29, 2019.
International search report in international application No. PCT/CN2016/110753, dated Sep. 14, 2017.
Written opinion of the international search authority in international application No. PCT/CN2016/110753, dated Sep. 14, 2017.
First Office Action of the Brazilian application No. 1120190123873, dated Sep. 24, 2020.
Fourth Office Action of the Chinese application No. 201680091694.1, dated Sep. 10, 2020.
LG Electronics "Discussion on resource unit for control channel" 3GPP TSG RAN WG1 Meeting #87 R1-1611835 Reno, USA Nov. 14-18, 2016.
ZTE "Consideration on channel coding for Nr" 3GPP TSG RAN WG1 #86 R1-167901 Gothenburg, Sweden, Aug. 22-26, 2016.
First Office Action of the Japanese application No. 2019-532670, dated Dec. 18, 2020.
First Office Action of the Indian application No. 201917024715, dated Jan. 5, 2021.
First Office Action of the Taiwanese application No. 106141459, dated Mar. 17, 2021.
European Search Report in the European application No. 20210300.8, dated Mar. 10, 2021.

* cited by examiner

 CCE AL=1
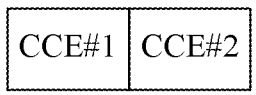 CCE AL=2
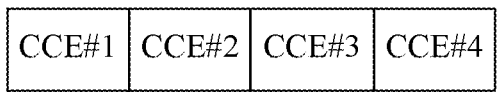 CCE AL=4
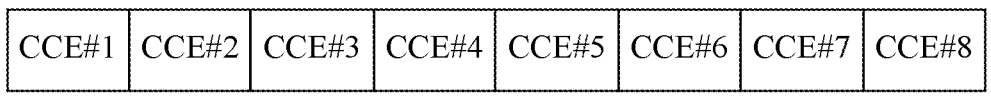 CCE AL=8
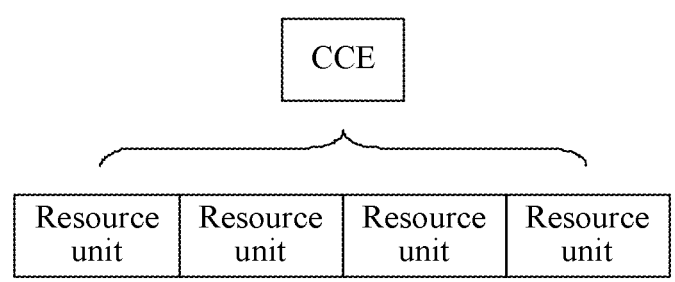
FIG. 3

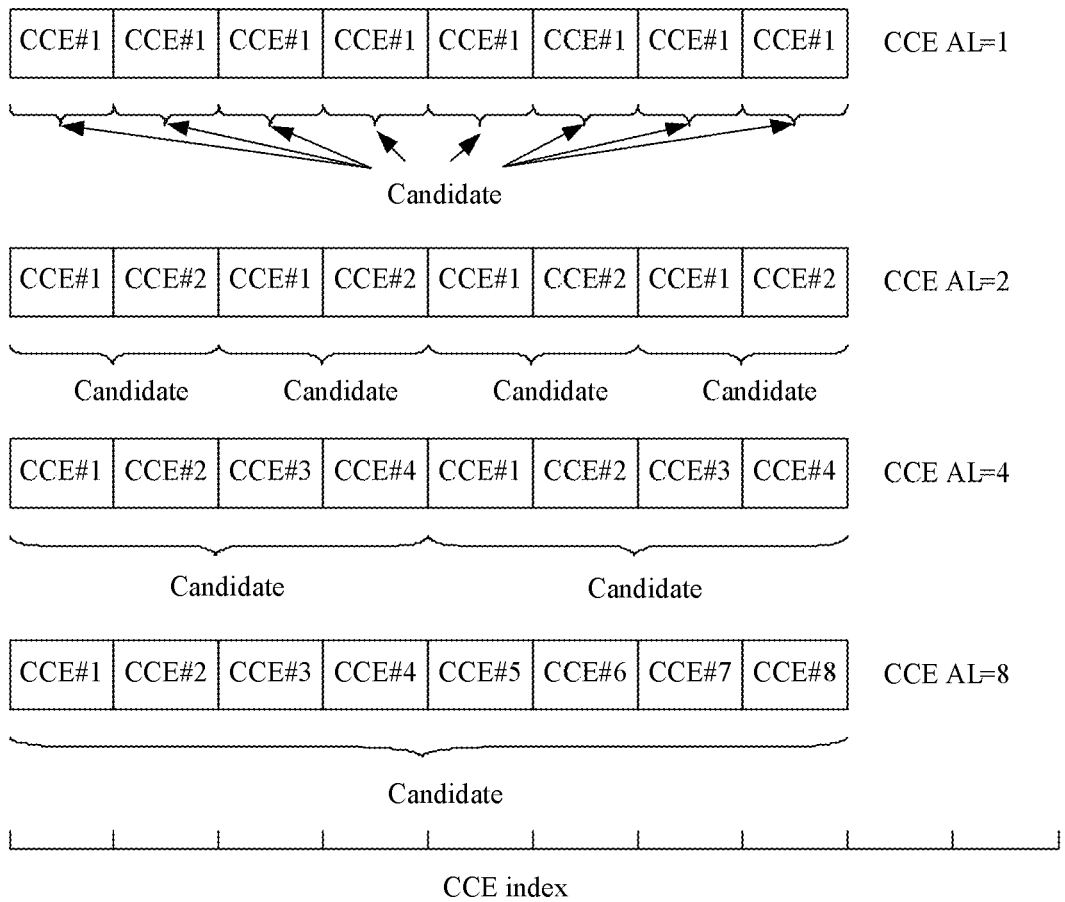

A time-frequency resource for a downlink control channel of at least one terminal device is determined, the time-frequency resource for the downlink control channel of the at least one terminal device being mapped in a first control region in a system bandwidth in a manner of mapping in a frequency domain and then in a time domain — S510

The downlink control channel of the at least one terminal device is sent through the time-frequency resource for the downlink control channel of the at least one terminal device — S520

FIG. 5

METHOD FOR TRANSMITTING INFORMATION, NETWORK DEVICE AND TERMINAL DEVICE

CROSS-REFERENCE TO RELATED APPLICATION

The present application is the U.S. national phase application of PCT Application No.PCT/CN2016/110753 filed on Dec. 19, 2016, the disclosure of which is incorporated herein in its entirety by reference.

TECHNICAL FIELD

The application relates o the field of communication, and more particularly to a method, network device and terminal device for transmitting information.

BACKGROUND

A downlink control channel in a Long Term Evolution (LTE) system is transmitted on first few Orthogonal Frequency Division Multiplexing (OFDM) symbols of each time-domain scheduling unit (called a subframe in LTE). A control region is time-frequency resources in first few OFDMsymbols of the whole system bandwidth, and is shared by each terminal device. A control channel configured for a terminal device is transmitted by a network side at some specific positions related to the terminal device. The physical resources with different sizes may also dynamically allocated by the network side according to a requirement such as a load of a control signal and a coding bit error rate to transmit a control channel of each terminal. The physical resources with different sizes and different specific positions form positions and available resources probably for transmission of the control channel configured for the terminal device. A certain specific position and the corresponding resource are called a candidate for the control channel configured for the terminal device, and all these candidates are collectively referred to as a control channel search space of the terminal device. The terminal device is required to perform blind detection on a candidate of its own control channel in its own control channel search space in a control region of each subframe to detect whether there is a control signal sent to it by the network side or not until finding the candidate. If the terminal device does not find its own control channel after completing blind detection over its own control channel search space, the terminal device may make such a hypothesis that the network side has no control channel to be sent to it.

There is a certain difference between control channel designs in a 5th-Generation (5G) system and LTE. First of all, a control region is not the whole system bandwidth but may be part of it. In addition, beamforming or other factors may also be required to be considered.

Therefore, there is an urgent need for a technical solution of control channel transmission suitable for a 5G system to improve system performance.

SUMMARY

Embodiments of the application provide a method, a network device and a terminal device for transmitting information, which may improve system performance.

A first aspect provides a method for transmitting information, which may include the following operations.

A time-frequency resource for a downlink control channel of at least one terminal device is determined, the time-frequency resource for the downlink control channel of the at least one terminal device being mapped in a first control region within a bandwidth of a system in a manner of mapping in a frequency domain and then in a time domain.

The downlink control channel of the at least one terminal device is sent through the time-frequency resource for the downlink control channel of the at least one terminal device.

In the embodiments of the application, a network device maps the time-frequency resource for the downlink control channel of the at least one terminal device in the first control region in the manner of mapping in the frequency domain and then in the time domain. In such a manner, one or more downlink control channels may be mapped onto an OFDM symbol to facilitate implementation of a transmission manner such as beamforming according to a requirement of a 5G system, so that downlink coverage may be improved, and system performance may be improved.

In some possible implementation modes, the manner of mapping in the frequency domain and then in the time domain may include the following operations.

A first OFDM symbol in the first control region is mapped along the frequency domain, and then a next OFDM symbol in the first control region is mapped.

In some possible implementation modes, the operation that the time-frequency resource for the downlink control channel of the at least one terminal device may include the following operations.

A Control Channel Element (CCE) resource corresponding to at least one control channel candidate of a specific terminal device in the at least one terminal device in the first control region is determined according to at least one of: a Radio Network Temporary Identity (RNTI) of the specific terminal device, a present time-domain scheduling unit number, a carrier frequency number, a CCE Aggregation Level (AL), a beam number and/or a cell identifier.

Responsive to that the CCE resource corresponding to the first control channel candidate is not allocated, the CCE resource corresponding to the first control channel candidate is allocated to the specific terminal device, and responsive to that the CCE resource corresponding to the first control channel candidate has been allocated, an unallocated CCE resource corresponding to a next control channel candidate is allocated to the specific terminal device.

After CCE resource allocation for the at least one terminal device is completed, a CCE resource in the first control region is mapped in the manner of mapping in the frequency domain and then in the time domain to obtain the time-frequency resource for the downlink control channel of the at least one terminal device.

In some possible implementation modes, a CCE resource corresponding to a control channel candidate may be continuous on the frequency domain.

In some possible implementation modes, the method may further include the following operation.

Control region configuration information is sent to the at least one terminal device, the control region configuration information being for indicating a configuration of the first control region.

In some possible implementation modes, the method may further include the following operation.

Configuration information of a first search space is sent to the specific terminal device in the at least one terminal device, the configuration information of the first search space being for indicating an OFDM symbol where the time-frequency resource for the downlink control channel of the specific terminal device is located.

In some possible implementation modes, an OFDM symbol in the first control region may be associated with a beam number, and the time-frequency resource for the downlink control channel corresponding to a specific beam number may be located on the OFDM symbol associated with the specific beam number.

In some possible implementation modes, the method may further include the following operation.

Configuration information of a second search space is sent to the at least one terminal device, the configuration information of the second search space being for indicating the OFDM symbol associated with the beam number.

In some possible implementation modes, the operation that the downlink control channel of the at least one terminal device is sent through the time-frequency resource for the downlink control channel of the at least one terminal device may include the following operation.

The downlink control channel of the at least one terminal device is sent by beamforming on at least one OFDM symbol in the first control region through the time-frequency resource for the downlink control channel of the at least one terminal device.

A second aspect provides a method for transmitting information, which may include the following operations.

A time-frequency resource for a downlink control channel of at least one terminal device is determined, the time-frequency resource for the downlink control channel of the at least one terminal device being mapped in a first control region within a bandwidth of a system in a manner of mapping in a time domain and then in a frequency domain.

The downlink control channel of the at least one terminal device is sent through the time-frequency resource for the downlink control channel of the at least one terminal device.

In the embodiments of the application, a network device maps the time-frequency resource for the downlink control channel of the at least one terminal device in the first control region in the manner of mapping in the time domain and then in the frequency domain. In such a manner, one or more downlink control channels may be mapped onto different OFDM symbols on a Physical Resource Block (PRB) to multiplex control channel resources and save control channel resources, so that system performance may be improved.

In some possible implementation modes, the manner of mapping in the time domain and then in the frequency domain may include the following operations.

All OFDM symbols on a first PRB in the first control region are mapped along the time domain, and then all OFDM symbols on a next PRB in the first control region are mapped.

In some possible implementation modes, the operation that the time-frequency resource for the downlink control channel of the at least one terminal device may include the following operations.

A CCE resource corresponding to at least one control channel candidate of a specific terminal device in the at least one terminal device in the first control region is determined according to at least one of: an RNTI of the specific terminal device, a present time-domain scheduling unit number, a carrier frequency number, a CCE AL, a beam number and/or a cell identifier.

Responsive to that the CCE resource corresponding to the first control channel candidate is not allocated, the CCE resource corresponding to the first control channel candidate is allocated to the specific terminal device, and responsive to that the CCE resource corresponding to the first control channel candidate has been allocated, an unallocated CCE resource corresponding to a next control channel candidate is allocated to the specific terminal device.

After CCE resource allocation for the at least one terminal device is completed, the CCE resources in the first control region are mapped in the manner of mapping in the time domain and then in the frequency domain to obtain the time-frequency resource for the downlink control channel of the at least one terminal device.

In some possible implementation modes, a CCE resource corresponding to a control channel candidate may be continuous on the frequency domain/the time domain.

In some possible implementation modes, the method may further include the following operation.

Control region configuration information is sent to the at least one terminal device, the control region configuration information being for indicating a configuration of the first control region.

A third aspect provides a method for transmitting information, which may include the following operations.

Configuration information sent by a network device is received, the configuration information being for indicating a configuration of a first control region corresponding to a terminal device within a bandwidth of a system.

A downlink control channel of the terminal device is detected in the first control region according to the configuration information.

In some possible implementation modes, the operation that the downlink control channel of the terminal device is detected in the first control region according to the configuration information may include the following operations.

The first control region and a mapping manner for the first control region are determined according to the configuration information.

A CCE resource corresponding to at least one control channel candidate of the terminal device in the first control region is determined according to at least one of: an RNTI of the specific terminal device, a present time-domain scheduling unit number, a carrier frequency number, a CCE AL, a beam number or a cell identifier.

The downlink control channel of the terminal device is detected according to the CCE resource corresponding to the at least one control channel candidate and the mapping manner.

In some possible implementation modes, the mapping manner for the first control region may be a manner of mapping in a frequency domain and then in a time domain, and the first control region may include one or more OFDM symbols.

In some possible implementation modes, the mapping manner for the first control region may be a manner of mapping in a time domain and then in a frequency domain, and the first control region may include multiple OFDM symbols.

A fourth aspect provides a network device, which includes modules configured to execute the method in the first aspect or any possible implementation mode of the first aspect.

A fifth aspect provides a network device, which includes modules configured to execute the method in the second aspect or any possible implementation mode of the second aspect.

A sixth aspect provides a terminal device, which includes modules configured to execute the method in the third aspect or any possible implementation mode of the third aspect.

A seventh aspect provides a network device. The network device includes a processor, a memory and a communication interface. The processor is connected with the memory and the communication interface. The memory is configured to store an instruction, the processor is configured to execute the instruction, and the communication interface is configured for communicating with other network element(s) under control of the processor. When the processor executes the instruction stored in the memory, such execution enables the processor to execute the method in the first aspect or any possible implementation mode of the first aspect, or the second aspect or any possible implementation mode of the second aspect.

An eighth aspect provides a terminal device. The terminal device includes a processor, a memory and a communication interface. The processor is connected with the memory and the communication interface. The memory is configured to store an instruction, the processor is configured to execute the instruction, and the communication interface is configured for communicating with other network element(s) under control of the processor. When the processor executes the instruction stored in the memory, such execution enables the processor to execute the method in the third aspect or any possible implementation mode of the third aspect.

A ninth aspect provides a computer-readable medium, which is configured to store a computer program, the computer program including an instruction configured to execute the method in the first aspect or any possible implementation mode of the first aspect.

A tenth aspect provides a computer-readable medium, which is configured to store a computer program, the computer program including an instruction configured to execute the method in the second aspect or any possible implementation mode of the second aspect.

An eleventh aspect provides a computer-readable medium, which is configured to store a computer program, the computer program including an instruction configured to execute the method in the third aspect or any possible implementation mode of the third aspect.

BRIEF DESCRIPTION OF DRAWINGS

FIG. 3 is a schematic diagram of CCEs according to an embodiment of the application.

FIG. 4 is a schematic diagram of control channel candidates according to an embodiment of the application.

FIG. 5 is a schematic flowchart of a method for transmitting information according to an embodiment of the application.

DETAILED DESCRIPTION

The technical solutions in the embodiments of the application will be described below in combination with the drawings in the embodiments of the application.

Figure 1:
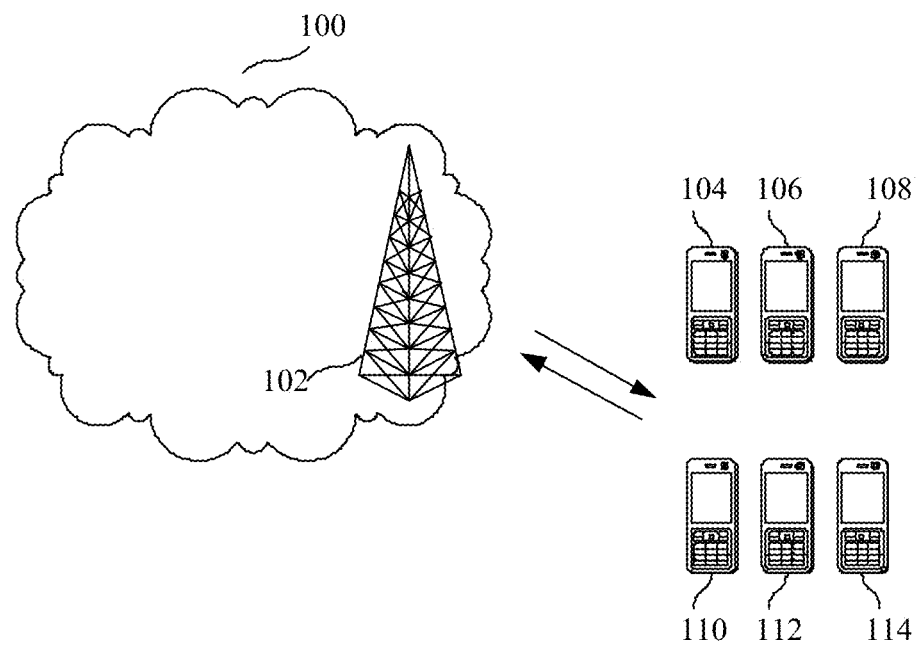
FIG. 1 is a schematic diagram of a communication system to which the embodiments of the application may be applied.

FIG. 1 is a schematic diagram of a communication system to which the embodiments of the application may be applied. As shown in FIG. 1, a network 100 may include a network device 102 and terminal devices 104, 106, 108, 110, 112 and 114 Here, the network device is wirelessly connected with the terminal devices. It is to be understood that FIG. 1 is only described with the example that the network includes one network device, which however is not intended to limit the embodiments of the application. For example, the network may include more than one network devices. Similarly, the network may include more terminal devices, and the network device may also include other devices.

Each embodiment of the application is described in combination with a terminal device. The terminal device may also refer to User Equipment (UE), an access terminal, a user unit, a user station, a mobile radio station, a mobile station, a remote station, a remote terminal, a mobile device, a user terminal, a terminal, a wireless communication device, a user agent, a user device or the like. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, a processing device connected to a wireless modem, a vehicle-mounted device, a wearable device, a terminal device in a future 5G network, a terminal device in a future evolved Public Land Mobile Network (PLMN) or the like.

Each embodiment of the application is described in combination with a network device. The network device may be a device configured to communicate with the terminal device. The network device may be a Base Transceiver Station (BTS) in a Global System of Mobile Communication (GSM) or Code Division Multiple Access (CDMA) system, or may also be a NodeB (NB) in a Wideband Code Division Multiple Access (WCDMA) system, or may also be an Evolutional Node B (eNB or eNodeB) in an LTE system, or may be a wireless controller in a Cloud Radio Access Network (CRAM) scenario. Or the network device may be a relay station, an access point, a vehicle-mounted device, a wearable device, a network device in a future 5G network, a network device in a future evolved PLMN or the like.

There are two types of downlink control channels in a 5G system. One is common control channels and the other is UE-specific downlink control channels. A common control channel is configured to broadcast some common information to all terminal devices or part of terminal devices. A UE-specific downlink control channel is configured to transmit downlink related control information, such as configuration information about data transmission, to a specified terminal device. The terminal device may detect the downlink control information configured for the terminal device in a downlink time-domain scheduling unit such as a slot or a mini-slot to determine whether downlink data is transmitted in a network or not and demodulates the downlink data through the related configuration information. The technical solutions of the embodiments of the application may be applied to UE-specific downlink control channels.

Figure 2:
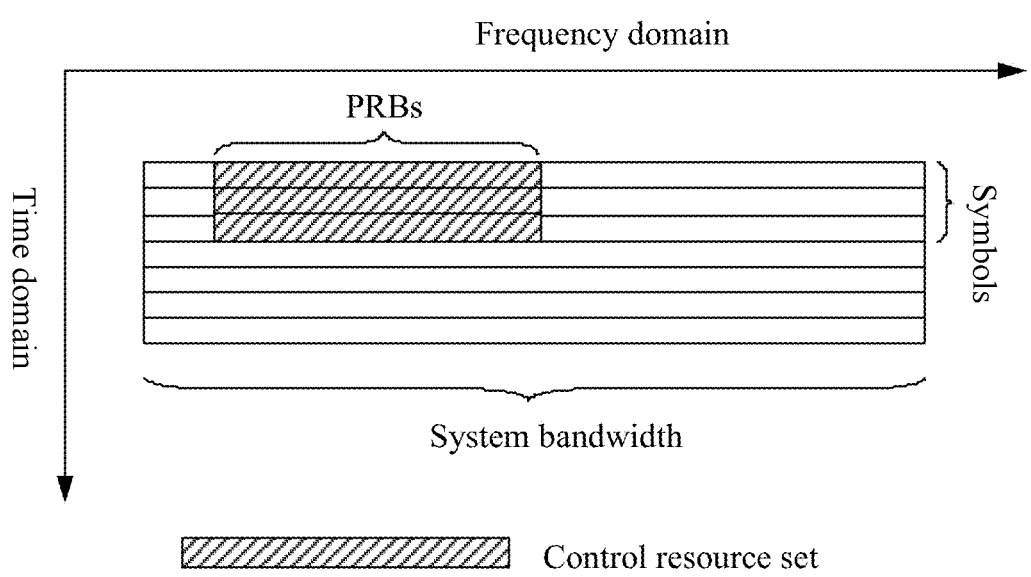
FIG. 2 is a schematic diagram of a resource set according to an embodiment of the application.

Unlike a 4th-Generation (4G) system, in a 5G system, a downlink control region, also called a control resource set, does not cover the whole system bandwidth on a frequency domain but only include part of frequency-domain resources. This region may be formed by a plurality of continuous or discontinuous PRBs in the frequency domain. This is because a frequency band covered by the 5G system may be very wide (particularly in a high frequency band), as a result, a large number of resources of the terminal device may be consumed in a case that the terminal device is required to detect a control channel on the whole frequency band. In a time domain, the downlink control region is not formed by all OFDM symbols in a time-domain scheduling unit but formed by one or more OFDM symbols. Generally speaking, the OFDM symbols are located at the start of the downlink time-domain scheduling unit. Such a design is adopted to ensure that there is sufficient time for the terminal device to complete demodulating a data channel after detecting a control signal to meet requirements of some applications, particularly a requirement of a low-latency application. FIG. 2 illustrates such a resource set.

A control channel is usually transmitted by the following steps: a cyclic error correcting code is added to the tail of control information, then is coded, modulated and preprocessed (via, for example, transmit diversity or beamforming) through the control channel and then is transmitted on an allocated physical resource.

Since control channels may have different loads, code rates after coding are also different (according to requirements on the bit error rate and the channel quality). A downlink control channel may be transmitted through one or more CCEs, for example, through 1, 2, 4, 8, . . . CCEs, and this is also called a CCE aggregation level (CCE AL). As shown in FIG. 3, a CCE may also be formed by a few control resource units, and a control resource unit is a time-frequency resource formed by a PRB in the frequency domain and an (or more) OFDM symbol in the time domain, and may be considered as a minimum resource unit for control channel transmission.

A downlink control region may be shared by multiple terminal devices, which means that downlink control channels of all of the multiple terminal devices are transmitted in this downlink control region. Generally speaking, a terminal device is required to perform blind detection in a corresponding downlink control region in a time-domain scheduling unit to obtain its own downlink control channel. For avoiding collisions between downlink control channels of different terminal devices in the same downlink control region, the downlink control channel sent to each terminal device is required to be transmitted on a specific resource, and the terminal device is also required to search its own downlink control channel by blind detection on the specific resource. These specific resources and different downlink control channel candidates which may be transmitted thereon, for example, candidates based on the same or different CCE ALs, are collectively referred to as search spaces of the downlink control channels of the terminal devices.

FIG. 4 illustrates an example of different downlink control channel candidates, based on the same or different CCE ALs, of a terminal device. For example, there may be eight candidates based on CCE AL=1. For example, there may be four candidates based on CCE AL=2. For example, there may be two candidates based on CCE AL=4. For example, there may be one candidate based on CCE AL=8. Resources for these candidates may be completely overlapped, or partially overlapped, or non-overlapped. The terminal device may not know about the specific candidate (including the candidates based on the same or different CCE ALs) adopted by a network side to send its control channel, and thus is not required to detect its own control channel by blind detection on all the resources of all the possible candidates. If no control signal for the terminal device is detected on all the possible candidates, the terminal device has to make such a hypothesis that the network side does not send the control signal to it in a present scheduling unit.

FIG. 5 is a schematic flowchart of a method 500 for transmitting information according to an embodiment of the application. The method 500 is executed by a network device, for example, a network device 102 in FIG. 1. As shown in FIG. 5, the method 500 includes the following operations.

In S510, a time-frequency resource for a downlink control channel of at least one terminal device is determined, the time-frequency resource for the downlink control channel of the at least one terminal device being mapped in a frequency domain and then in a time domain in a first control region within a bandwidth of a system.

In S520, the downlink control channel of the at least one terminal device is sent through the time-frequency resource for the downlink control channel of the at least one terminal device.

In the embodiment of the application, the first control region is a control region in the system bandwidth. The network device maps the time-frequency resource for the downlink control channel of the at least one terminal device in the first control region in the manner of mapping in the frequency domain and then in the time domain. In such a manner, one or more downlink control channels may be mapped onto an OFDM symbol to facilitate transmission such as beamforming according to a requirement of a 5G system, so that downlink coverage may be improved, and system performance may be improved.

Optionally, the manner of mapping in the frequency domain and then in the time domain includes the following operations:

a first OFDM symbol in the first control region is mapped in the frequency domain, and then a next OFDM symbol in the first control region is mapped.

Optionally, the network device may determine a CCE resource corresponding to at least one control channel candidate of a specific terminal device in the at least one terminal device in the first control region according to at least one of: an RNTI of the specific terminal device, a present time-domain scheduling unit number, a carrier frequency number, a CCE AL, a beam number and/or a cell identifier.

If the CCE resource corresponding to the first control channel candidate is not allocated, the CCE resource corresponding to the first control channel candidate is allocated to the specific terminal device. If the CCE resource corresponding to the first control channel candidate has been allocated, an unallocated CCE resource corresponding to a next control channel candidate is allocated to the specific terminal device.

After CCE resource has been allocated for the at least one terminal device, the CCE resources in the first control region are mapped in the manner of mapping in the frequency domain and then in the time domain to obtain the time-frequency resource for the downlink control channel of the at least one terminal device.

Specifically, the network device arranges all possible downlink control channel resources in the first control region by taking a CCE as a unit and then determines a CCE resource corresponding to a certain control channel candidate of the specific terminal device in the first control region according to one or more of the parameters. These resources are continuous CCEs (for example, if N CCEs are used for the whole channel, N continuous CCE resources are used).

If part or all of a CCE resource corresponding to a control channel candidate has been allocated to other terminal device(s), the network device may continue determining a CCE resource corresponding to a next control channel candidate until finding a CCE resource which may be configured to transmit the control channel candidate and has yet not been used.

The network device repeats the steps to determine a resource available for a downlink control channel candidate of each terminal device which may be scheduled.

Then, the network device maps the CCE resources (allocated and unallocated) in the first control region onto physical resources in sequence in the manner of mapping in the frequency domain and then in the time domain. For example, the first OFDM symbol in the first control region is filled along the frequency domain, then the second OFDM symbol in the first control region is filled along the frequency domain, and the rest can be done in the same manner till the end.

When the manner of mapping in the frequency domain and then in the time domain is adopted, the CCE resource corresponding to a control channel candidate is continuous on the frequency domain.

In the embodiment, a time-frequency resource of a downlink control channel of a certain terminal device may be located on an OFDM symbol. That is, for the terminal device, the control region may be an OFDM symbol.

Figure 6:
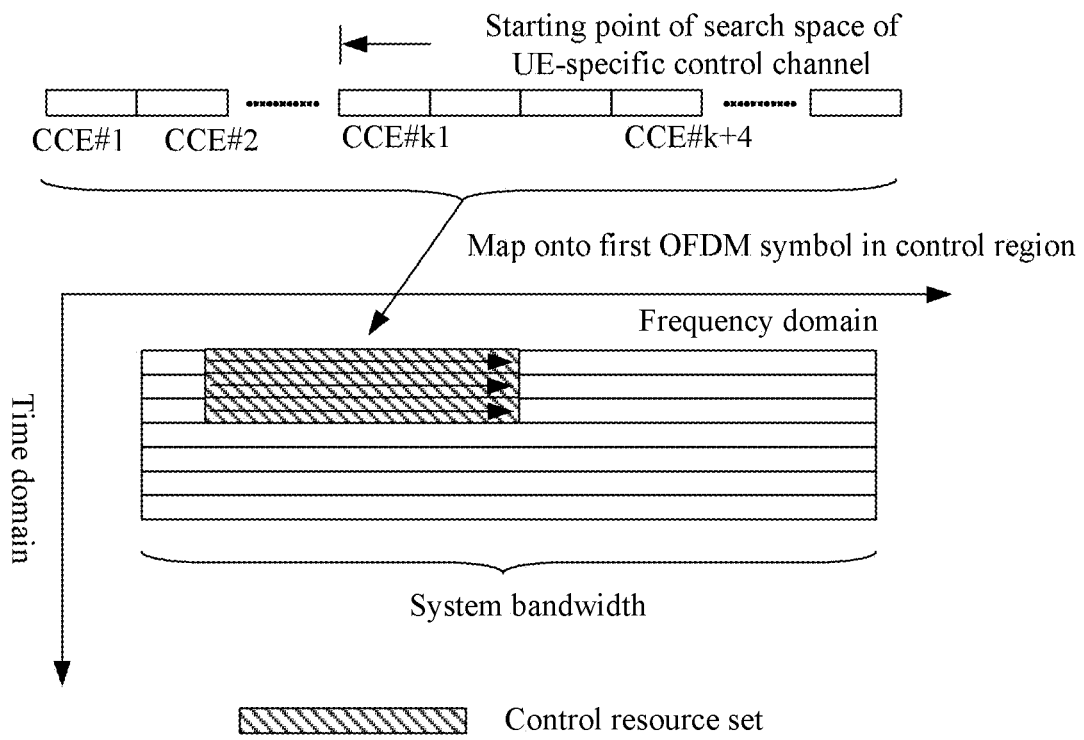
FIG. 6 is a schematic diagram of a mapping manner according to an embodiment of the application.

As shown in FIG. 6, if a control region (probably shared with other terminal(s)) allocated for a certain specific terminal is the first OFDM symbol (although the whole control resource set region includes three OFDM symbols), the network device arranges all CCEs sequentially in this time-frequency resource region, then determines an index of a starting CCE of a control channel resource for the terminal device according to the above rule and simultaneously determine how many CCEs are needed (namely determining a CCE AL) according to the load and code rate of control information. For example, if CCE AL=4, four CCEs are required, and the network device may allocate four continuous CCEs to the terminal device. After resource allocation has been completed for all terminal devices, the network device may map all the CCEs to the first OFDM symbol in the control resource set in sequence along the frequency domain. In addition, if multiple OFDM symbols are configured, the first OFDM symbol may be mapped along the frequency domain, then the second OFDM symbol is mapped along the frequency domain, and so on.

The solution of the embodiment may be applied to a beam system, in which one or more control channels are mapped onto an OFDM symbol for transmission, so that beamforming is facilitated, and downlink coverage and performance are improved.

Specifically, the network device may send the downlink control channel of the at least one terminal device by beamforming on at least one OFDM symbol in the first control region through the time-frequency resource for the downlink control channel of the at least one terminal device.

It is to be understood that, in the embodiment of the application, the first control region may include one or more OFDM symbols. That is, the network device may implement the technical solution of the embodiment of the application with a control region including one OFDM symbol, and the technical solution of the embodiment of the application may also be implemented with a control region including multiple OFDM symbols. For the control region including multiple OFDM symbols, with adoption of the manner of mapping in the frequency domain and then in the time domain, time-frequency resources for downlink control channels of one or more terminal devices may be located on one OFDM symbol.

Optionally, the network device may further send control region configuration information to the at least one terminal device, the control region configuration information being configured to indicate a configuration of the first control region.

Specifically, the control region configuration information may indicate a frequency-domain configuration and time-domain configuration of the first control region.

Since the time-frequency resource for the downlink control channel of the specific terminal device is located on an OFDM symbol in the first control region, the frequency-domain configuration of the first control region may also be determined as a frequency-domain configuration of a search space region of the control the specific terminal device.

Optionally, the network device may further send configuration information of a first search space to the specific terminal device in the at least one terminal device, the configuration information of the first search space being configured to indicate the OFDM symbol where the time-frequency resource for the downlink control channel of the specific terminal device is located. This is a time-domain configuration of the search space region of the control channel of the specific terminal device.

Optionally, the configuration of the first control region may be semi-statically configured through high-layer signaling. The time-domain configuration of the search space region of the control channel of the specific terminal device may be semi-statically configured through the high-layer signaling, or may also be dynamically configured through physical-layer signaling, for example, broadcasting through a physical-layer common channel.

Optionally, the OFDM symbols in the first control region may be associated with beam numbers, and the time-frequency resource for the downlink control channel corresponding to a specific beam number is located on the OFDM symbol associated with the specific beam number.

Optionally, the network device may further send configuration information of a second search space to the at least one terminal device, the configuration information of the second search space being configured to indicate the OFDM symbol associated with the beam number.

Search spaces may be configured for different beams by associating beam numbers with the OFDM symbols. For example, configuration may be made as shown in Table 1. Such configuration may refer to semi-static configuration with high-layer signaling.

TABLE 1

| Configuration value | Meaning |
| --- | --- |
| 00 | First OFDM symbol (frequency-domain mapping) |
| 01 | Second OFDM symbol (frequency-domain mapping) |
| 10 | Third OFDM symbol (frequency-domain mapping) |
| 11 | Time-domain mapping |

In Table 1, "time-domain mapping" may represent a manner of mapping in a time domain and then in a frequency domain described in the following embodiments.

Figure 7:
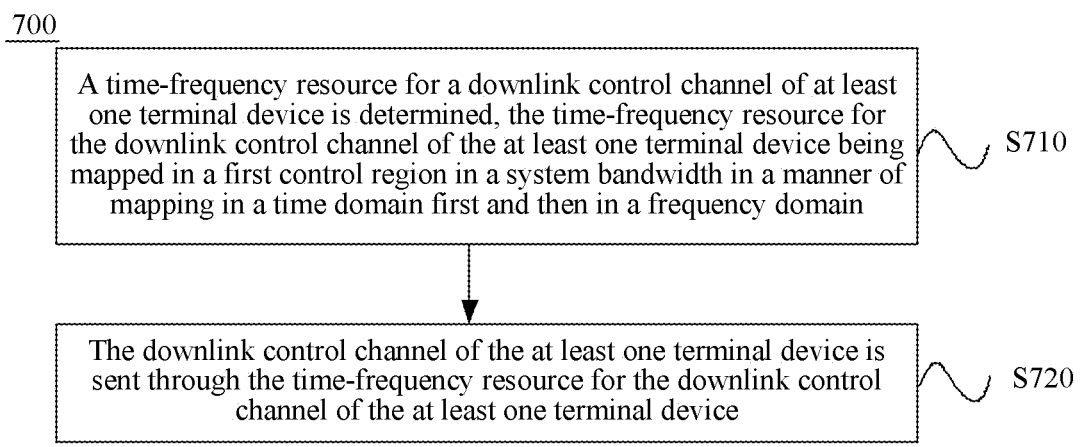
FIG. 7 is a schematic flowchart of a method for transmitting information according to another embodiment of the application.

FIG. 7 is a schematic flowchart of a method 700 for transmitting information according to another embodiment of the application. The method 700 is executed by a network device, for example, a network device 102 in FIG. 1. As shown in FIG. 7, the method 700 includes the following operations.

In S710, a time-frequency resource for a downlink control channel of at least one terminal device is determined, the time-frequency resource for the downlink control channel of the at least one terminal device being mapped in a first control region within a bandwidth of a system in a manner of mapping in a time domain and then in a frequency domain.

In S720, the downlink control channel of the at least one terminal device is sent through the time-frequency resource for the downlink control channel of the at least one terminal device.

In the embodiment of the application, the first control region is a control region in the system bandwidth. The network device maps the time-frequency resource for the downlink control channel of the at least one terminal device in the first control region in the manner of mapping in the time domain and then in the frequency domain. In such a manner, one or more downlink control channels may be mapped onto different OFDM symbols on a PRB to multiplex control channel resources and save control channel resources, so that system performance may be improved.

Optionally, the manner of mapping in the time domain and then in the frequency domain includes the following operations:

All OFDM symbols on a first PRB in the first control region are mapped along the time domain, and then all OFDM symbols on a next PRB in the first control region are mapped.

Optionally, the network device may determine a CCE resource corresponding to at least one control channel candidate of a specific terminal device in the at least one terminal device in the first control region according to at least one of: an RNTI of the specific terminal device, a present time-domain scheduling unit number, a carrier frequency number, a CCE AL, a beam number and/or a cell identifier.

If the CCE resource corresponding to the first control channel candidate is not allocated, the CCE resource corresponding to the first control channel candidate is allocated to the specific terminal device; and if the CCE resource corresponding to the first control channel candidate has been allocated, an unallocated CCE resource corresponding to a next control channel candidate is allocated to the specific terminal device.

After CCE resource allocation for the at least one terminal device has been completed, the CCE resources in the first control region are mapped in the manner of mapping in the time domain and then in the frequency domain to obtain the time-frequency resource for the downlink control channel of the at least one terminal device.

Specifically, the network device sequentially arranges all possible downlink control channel resources in the first control region by taking a CCE as a unit and then determines a CCE resource corresponding to a certain control channel candidate of the specific terminal device in the first control region according to one or more of the parameters. These resources are continuous CCEs (for example, if N CCEs are used for the whole channel, N continuous CCE resources are used).

If part or all of a CCE resource corresponding to a control channel candidate has been allocated to other terminal device(s), the network device may continue determining a CCE resource corresponding to a next control channel candidate until finding a CCE resource which can be used to transmit the control channel candidate and has yet not been used.

The network device repeats the operations above to determine a resource available for a downlink control channel candidate of other terminal device(s).

Then, the network device maps the CCE resources (allocated and unallocated) in the first control region onto physical resources in sequence in the manner of mapping in the time domain and then in the frequency domain. For example, all OFDM symbols (which may be filled by taking a control resource unit as a unit) allocated to control channels in a PRB in the first control region are filled along the time domain, then all OFDM symbols allocated to the control channels in a next PRB in the first control region are filled along the time domain, and the rest can be done in the same manner till the end.

Optionally, the CCE resource corresponding to a control channel candidate is continuous on the frequency domain/the time domain.

Figures 8, 9:
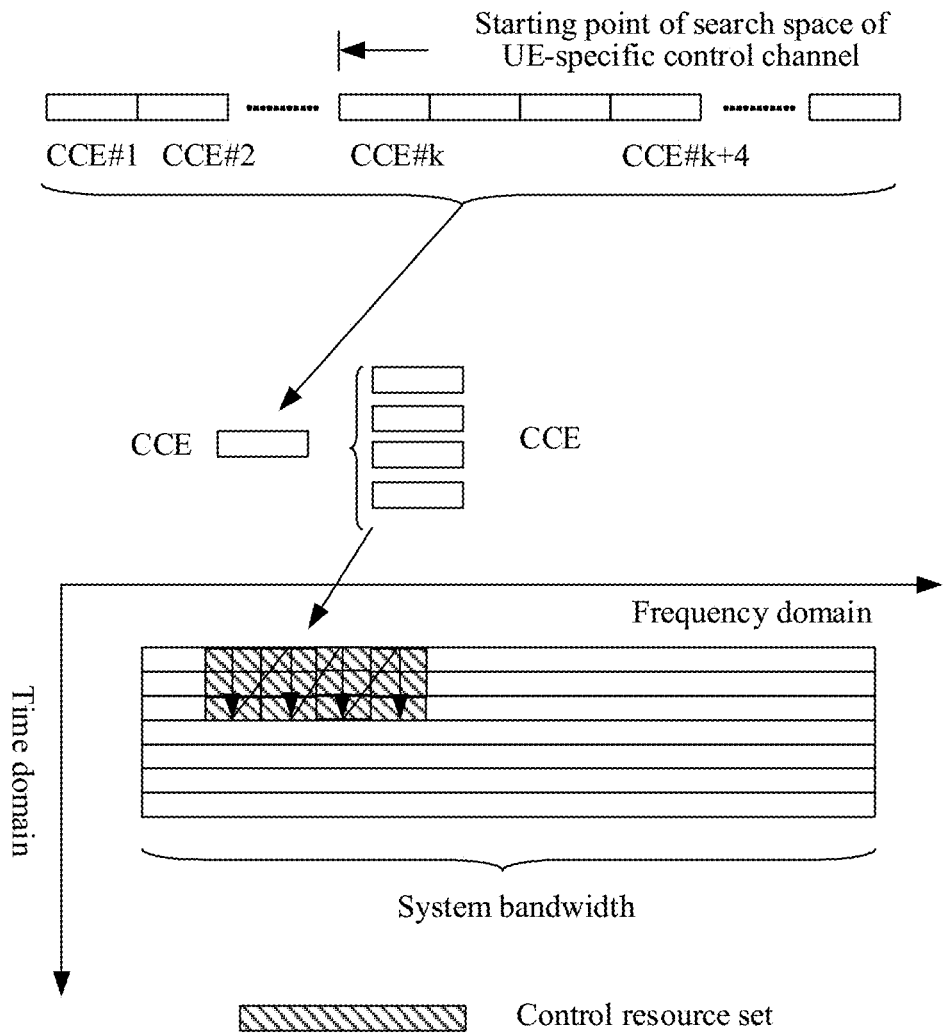
FIG. 8 is a schematic diagram of a mapping manner according to another embodiment of the application.
FIG. 9 is a schematic flowchart of a method for transmitting information according to another embodiment of the application.

As shown in FIG. 8, if a control region (probably shared with other terminal(s)) allocated for a certain specific terminal is the whole control resource set region (including three OFDM symbols), the network device arranges all CCEs in this time-frequency resource region in sequence, then determines an index of a starting CCE of a control channel resource for the terminal device according to the above rule and simultaneously determine the number of required CCEs (namely determining a CCE AL) according to a load and code rate of control information. For example, if CCE AL=4, four CCEs are required, and the network device may allocate four continuous CCEs to the terminal device. After resource allocation for the control channels of all the terminal devices to be scheduled is completed, the network device may divide all the CCEs into a plurality of resource units (four in the FIG. 8), and if each resource unit occupies time-frequency resources of a frequency-domain PRB and a time-domain OFDM symbol, the network device maps the CCEs (and the resource units therein) onto all the OFDM symbols in sequence (according to a sequence from small to large symbol indexes) on the first PRB in the control resource set along the time domain, then maps them onto all the OFDM symbols on a second PRB in the control resource set in sequence, and adopts the same manner for the rest to complete all mapping.

The solution of the embodiment may be applied to a non-beam system, in which one or more control channels are mapped onto different OFDM symbols on a PRB for transmission, so that control channel resources may be multiplexed, and control channel resources are saved.

Optionally, the network device may further send control region configuration information to the at least one terminal device, the control region configuration information being configured to indicate a configuration of the first control region.

The control region configuration information may indicate a frequency-domain configuration and time-domain configuration of the first control region.

Optionally, the configuration of the first control region may be semi-statically configured through high-layer signaling.

The information transmission method of the embodiments of the application is described above from a network device side, and the information transmission method of the embodiments of the application will be described below from a terminal device side.

FIG. 9 is a schematic flowchart of a method 900 for transmitting information according to an embodiment of the application. The method 900 is executed by a terminal device, for example, a terminal device in FIG. 1. As shown in FIG. 9, the method 900 includes the following operations.

In S910, configuration information sent by a network device is received, the configuration information indicating a configuration of a first control region corresponding to a terminal device within a bandwidth of a system.

In S920, a downlink control channel of the terminal device is detected in the first control region according to the configuration information.

Optionally, the terminal device may determine the first control region and a mapping manner for the first control region according to the configuration information.

A CCE resource corresponding to at least one control channel candidate of the terminal device in the first control region is determined according to at least one of: an RNTI of the specific terminal device, a present time-domain scheduling unit number, a carrier frequency number, a CCE AL, a beam number or a cell identifier.

The downlink control channel of the terminal device is detected according to the CCE resource corresponding to the at least one control channel candidate and the mapping manner.

Optionally, the mapping manner for the first control region is a manner of mapping in the frequency domain and then in the time domain, and the first control region includes one or more OFDM symbols.

Optionally, the mapping manner for the first control region is a manner of mapping in the time domain and then in the frequency domain, and the first control region includes multiple OFDM symbols.

Specifically, the terminal device may determine a size of the control region, the mapping manner and the total number of CCEs according to the configuration information, then determine a CCE resource corresponding to a certain control channel candidate of the terminal device in the control region according to one or more of the parameters and perform blind detection on the control channel according to the CCE resource corresponding to the control channel candidate and the mapping manner. If blind detection fails, the terminal device repeats the operations above to detect other control channel candidate(s) until detecting its own control channel, and if not, the terminal device may make such a hypothesis that the network device does not send its control channel.

It is to be understood that, in the embodiment of the application, interaction between the network device and the terminal device as well as related properties, functions and the like described from the network device side correspond to descriptions made from the terminal device side and will not be elaborated herein for simplicity.

It is to be understood that, in various embodiments of the application, a magnitude of a sequence number of each process does not mean an execution sequence. The execution sequence of each process should be determined by its function and an internal logic, but should not form any limit to an implementation process of the embodiments of the application.

The information transmission method according to the embodiments of the application is described above in detail. The network device and terminal device according to the embodiments of the application will be described below. It is to be understood that the network device and terminal device of the embodiments of the application may execute various methods in the abovementioned embodiments of the application. That is, the following specific working process of each device may refer to the corresponding process in the method embodiments.

Figure 10:
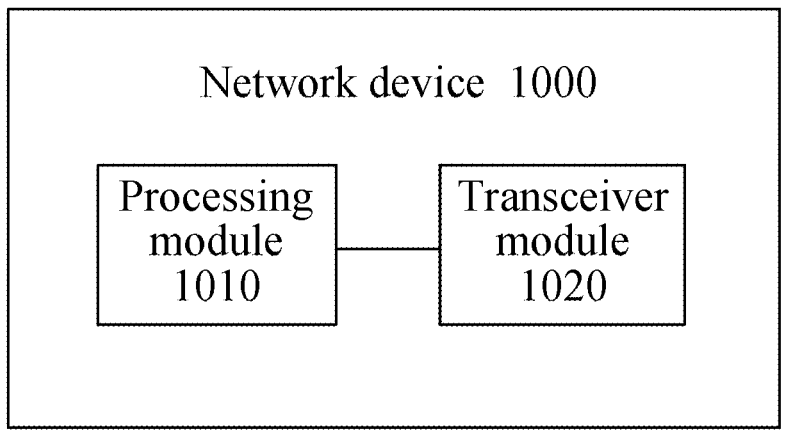
FIG. 10 is a schematic block diagram of a network device according to an embodiment of the application.

FIG. 10 is a schematic block diagram of a network device 1000 according to an embodiment of the application. As shown in FIG. 10, the network device 1000 includes a processing module 1010 and a transceiver module 1020.

The processing module 1010 determines a time-frequency resource for a downlink control channel of at least one terminal device, the time-frequency resource for the downlink control channel of the at least one terminal device being mapped in a first control region within a bandwidth of a system in a manner of mapping in a frequency domain and then in a time domain.

The transceiver module 1020 is configured to send the downlink control channel of the at least one terminal device through the time-frequency resource for the downlink control channel of the at least one terminal device.

Optionally, the manner of mapping in the frequency domain and then in the time domain includes the following operations.

A first OFDM symbol in the first control region is mapped along the frequency domain, and then a next OFDM symbol in the first control region is mapped.

Optionally, the processing module 1010 is specifically configured to:

determine a CCE resource corresponding to at least one control channel candidate of a specific terminal device in the at least one terminal device in the first control region according to at least one of: an RNTI of the specific terminal device, a present time-domain scheduling unit number, a carrier frequency number, a CCE AL, a beam number and/or a cell identifier;

if the CCE resource corresponding to the first control channel candidate is not allocated, allocate the CCE resource corresponding to the first control channel candidate to the specific terminal device, and if the CCE resource corresponding to the first control channel candidate has been allocated, allocate an unallocated CCE resource corresponding to a next control channel candidate to the specific terminal device; and after CCE resource allocation for the at least one terminal device is completed, map the CCE resources in the first control region in the manner of mapping in the frequency domain and then in the time domain to obtain the time-frequency resource for the downlink control channel of the at least one terminal device.

Optionally, the CCE resource corresponding to a control channel candidate is continuous on the frequency domain.

Optionally, transceiver module 1020 is further configured to send control region configuration information to the at least one terminal device, the control region configuration information being configured to indicate a configuration of the first control region.

Optionally, the transceiver module 1020 is further configured to send configuration information of a first search space to the specific terminal device in the at least one terminal device, the configuration information of the first search space being used to indicate the OFDM symbol where the time-frequency resource for the downlink control channel of the specific terminal device is located.

Optionally, the OFDM symbols in the first control region are associated with beam numbers, and the time-frequency resource for the downlink control channel corresponding to a specific beam number is located on the OFDM symbol associated with the specific beam number.

Optionally, the transceiver module 1020 is further configured to send configuration information of a second search space to the at least one terminal device, the configuration information of the second search space being used to indicate the OFDM symbol associated with the beam number.

Optionally, the transceiver module 1020 is specifically configured to send the downlink control channel of the at least one terminal device by heamforming on at least one OFDM symbol in the first control region through the time-frequency resource for the downlink control channel of the at least one terminal device.

Figure 11:
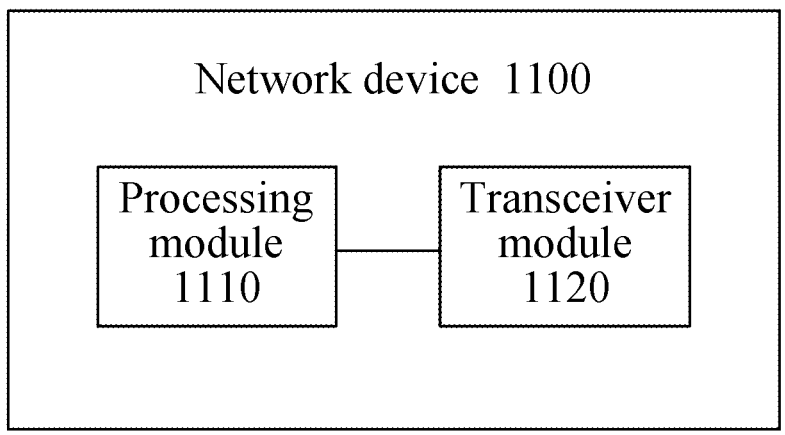
FIG. 11 is a schematic block diagram of a network device according to another embodiment of the application.

FIG. 11 is a schematic block diagram of a network device 1100 according to another embodiment of the application. As shown in FIG. 11, the network device 1100 includes a processing module 1110 and a transceiver module 1120.

The processing module 1110 is configured to determine a time-frequency resource for a downlink control channel of at least one terminal device, the time-frequency resource for the downlink control channel of the at least one terminal device being mapped in a first control region within a bandwidth of a system in a manner of mapping in a time domain and then in a frequency domain.

The transceiver module 1120 is configured to send the downlink control channel of the at least one terminal device through the time-frequency resource for the downlink control channel of the at least one terminal device.

Optionally, the manner of mapping in the time domain and then in the frequency domain includes the following operations:

all OFDM symbols on a first PRB in the first control region are mapped along the time domain, and then all OFDM symbols on a next PRB in the first control region are mapped.

Optionally, the processing module 1110 is specifically configured to:

determine a CCE resource corresponding to at least one control channel candidate of a specific terminal device in the at least one terminal device in the first control region according to at least one of: an RNTI of the specific terminal device, a present time-domain scheduling unit number, a carrier frequency number, a CCE AL, a beam number and/or a cell identifier;

if the CCE resource corresponding to the first control channel candidate is not allocated, allocate the CCE resource corresponding to the first control channel candidate to the specific terminal device, and if the CCE resource corresponding to the first control channel candidate has been allocated, allocate an unallocated CCE resource corresponding to a next control channel candidate to the specific terminal device: and after CCE resource allocation for the at least one terminal device is completed, map the CCE resources in the first control region in the manner of mapping in the time domain and then in the frequency domain to obtain the time-frequency resource for the downlink control channel of the at least one terminal device.

Optionally, the CCE resource corresponding to a control channel candidate is continuous on the frequency domain/the time domain.

Optionally, transceiver module 1120 is further configured to send control region configuration information to the at least one terminal device, the control region configuration information being configured to indicate a configuration of the first control region.

The network device 1000 and network device 1100 according to the embodiments of the application may correspond to the network device in the information transmission method according to the embodiments of the application and the abovementioned. Other operations and/or functions of each module therein are adopted to implement the corresponding flows of each method respectively and will not be elaborated herein for simplicity.

Figure 12:
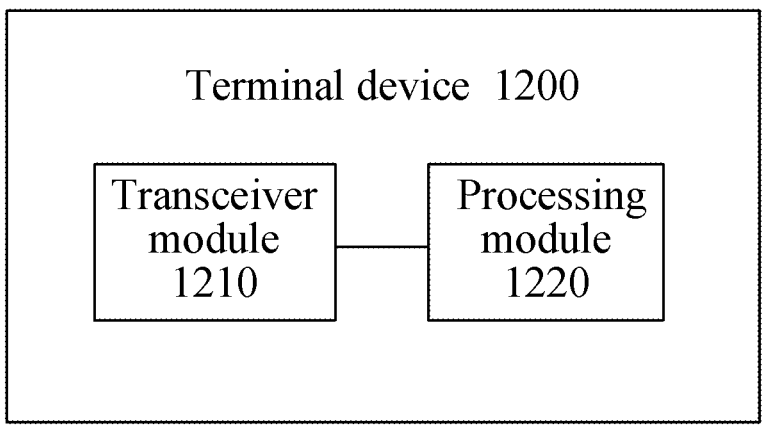
FIG. 12 is a schematic block diagram of a terminal device according to an embodiment of the application.

FIG. 12 is a schematic block diagram of a terminal device 1200 according to an embodiment of the application. As shown in FIG. 12, the terminal device 1200 includes a transceiver module 1210 and a processing module 1220.

The transceiver module 1210 is configured to receive configuration information from a network device, the configuration information indicating a configuration of a first control region corresponding to the terminal device within a bandwidth of a system.

The processing module 1220 is configured to detect a downlink control channel of the terminal device in the first control region according to the configuration information.

Optionally, the processing module 1220 is specifically configured to:

determine the first control region and a mapping manner for the first control region according to the configuration information;

determine a CCE resource corresponding to at least one control channel candidate of the terminal device in the first control region according to at least one of: an RNTI of the specific terminal device, a present time-domain scheduling unit number, a carrier frequency number, a CCE AL, a beam number or a cell identifier; and detect the downlink control channel of the terminal device according to the CCE resource corresponding to the at least one control channel candidate and the mapping manner.

Optionally, the mapping manner for the first control region is a manner of frequency domain mapping and then time domain mapping, and the first control region includes one or more OFDM symbols.

Optionally, the mapping manner for the first control region is a manner of time domain mapping and then frequency domain mapping, and the first control region includes multiple OFDM symbols.

The terminal device 1200 according to the embodiment of the application may correspond to the terminal device in the information transmission method according to the embodiment of the application and the abovementioned. Other operations and/or functions of each module in the terminal device 1200 are adopted to implement the corresponding flows of each method respectively and will not be elaborated herein for simplicity.

Figure 13:
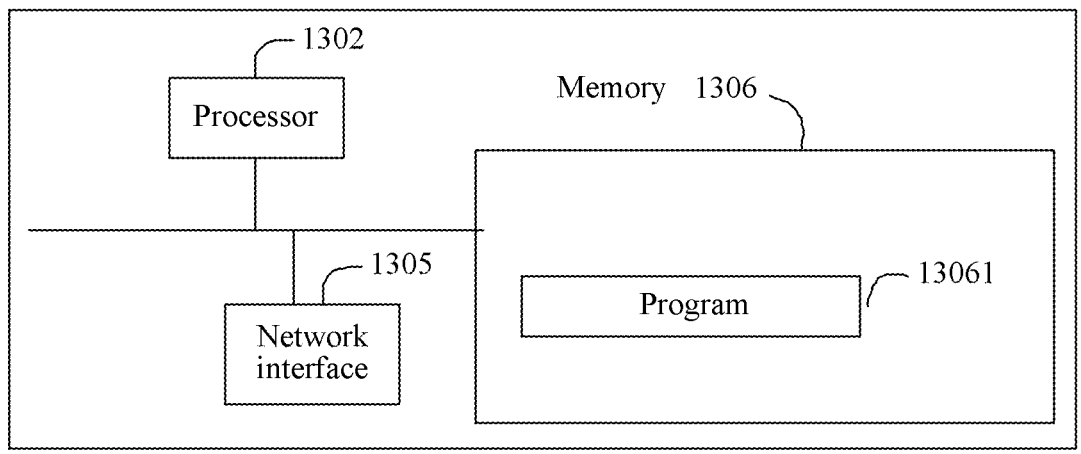
FIG. 13 is a schematic structure diagram of a network device according to another embodiment of the application.

FIG. 13 illustrates a structure of a network device according to another embodiment of the application. The structure includes at least one processor 1302 (for example, Central Processing Unit (CPU)), at least one network interface 1305 or other communication interface and a memory 1306. These components form communication connections. The processor 1302 is configured to execute an executable module, for example, a computer program, stored in the memory 1306. The memory 1306 may include a high-speed Random Access Memory (RAM) or may also include a non-volatile memory, for example, at least one disk memory. A communication connection with at least one network element is implemented through the at least one network interface 1305 (which may be wired or wireless)

In some implementation modes, the memory 1306 stores a program 13061, and the processor 1302 may execute the program 13061 to execute the method in each embodiment of the application.

Figure 14:
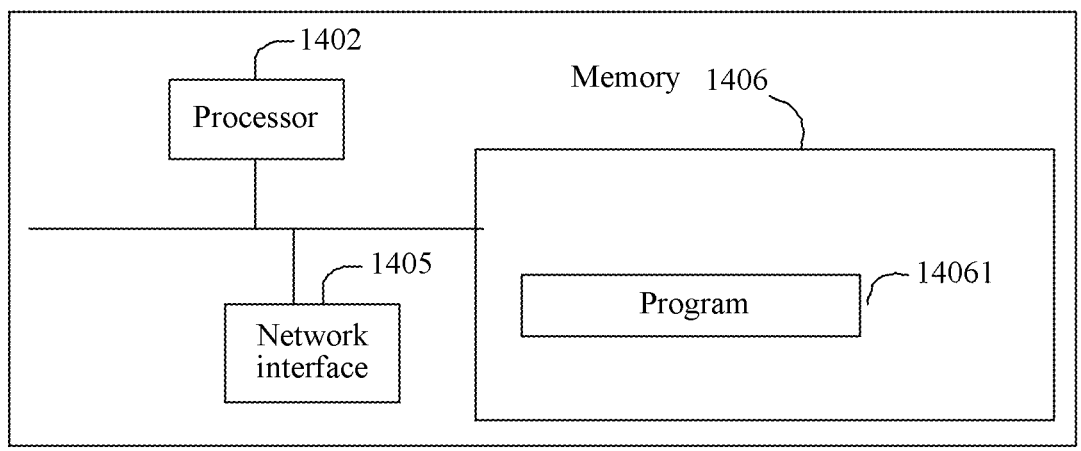
FIG. 14 is a schematic structure diagram of a terminal device according to another embodiment of the application.

FIG. 14 illustrates a structure of a terminal device according to another embodiment of the application. The structure includes at least one processor 1402 (for example, CPU), at least one network interface 1405 or other communication interface and a memory 1406. These components form communication connections. The processor 1402 is configured to execute an executable module, for example, a computer program, stored in the memory 1406. The memory 1406 may include a high-speed RAM and may also include a non-volatile memory, for example, at least one disk memory. A communication connection with at least one other network element may be implemented through the at least one network interface 1405 (which may be wired or wireless).

In some implementation modes, the memory 1406 stores a program 14061, and the processor 1402 executes the program 14061 to execute the method in each embodiment of the application.

It is to be understood that the specific examples in the embodiment of the application are adopted not to limit the scope of the embodiment of the application but to help those skilled in the art to better understand the embodiment of the application.

It is to be understood that, in the embodiments of the application, the term "and/or" represents only an association relationship describing associated objects and represents that there are three relationships. For example. A and/or B may represent three conditions, i.e., independent existence of A, coexistence of A and B and independent existence of B. In addition, character "/" in the disclosure usually represents that previous and next associated objects form an "or" relationship.

Those of ordinary skilled in the art may realize that the units and algorithm steps of each example described in combination with the embodiments disclosed in the disclosure may be implemented by electronic hardware, computer software or a combination of the two. For clearly describing exchangeability of hardware and software, the compositions and steps of each example have been generally described in the foregoing descriptions according to functions. Whether these functions are executed in a hardware or software manner depends on specific applications and design constraints of the technical solutions. Professionals may realize the described functions for each specific application through different methods, but such realization shall fall within the scope of the application.

Those skilled in the art may clearly learn about that specific working processes of the system, device and unit described above may refer to the corresponding processes in the method embodiments and will not be elaborated herein for convenient and brief description.

In some embodiments provided by the application, it is to be understood that the described system, device and method may be implemented in other manners. For example, the device embodiments described above are only schematic, and for example, division of the units is only logic function division, and other division manners may be adopted during practical implementation. For example, multiple units or components may be combined or integrated into other system(s), or some characteristics may be neglected or not executed. In addition, coupling or direct coupling or communication connection between each displayed or discussed component may be indirect coupling or communication connection between devices or units through interfaces, which may be electrical and mechanical or in other forms.

The units described as separate parts may or may not be physically separated, and parts displayed as units may or may not be physical units, which namely may be located in the saute place or may also be distributed to multiple network units. Part or all of the units may be selected to achieve the purpose of the solutions of the embodiments of the application according to a practical requirement.

In addition, each functional unit in each embodiment of the application may be integrated into a processing unit, each unit may also physically exist independently, and two or more than two units may also be integrated into a unit. The integrated unit may be implemented in a hardware form and may also be implemented in form of software functional unit.

When implemented in form of a software functional unit and sold or used as an independent product, the integrated unit may be stored in a computer-readable storage medium. Based on such an understanding, the technical solutions of the application substantially or the parts making contributions to the conventional art or all or part of the technical solutions may be embodied as a software product. The computer software product is stored in a storage medium, including a plurality of instructions configured to enable a computer device (which may be a personal computer, a server, a network device or the like) to execute all or part of the steps of the method in each embodiment of the application. The abovementioned storage medium includes: various media capable of storing program codes such as a U disk, a mobile hard disk, a Read-Only Memory (ROM), a RAM, a magnetic disk or an optical disk.

The above is only the specific implementation mode of the application and not intended to limit the scope of protection of the application. Various equivalent modifications or replacements are apparent to those skilled in the art within the technical scope disclosed by the application and these modifications or replacements shall fall within the scope of protection of the application. Therefore, the scope of protection of the application shall be subject to the scope of protection of the claims.

What is claimed is:

1. A method for transmitting information, comprising:
   determining a time-frequency resource for a downlink control channel of at least one terminal device, wherein the time-frequency resource for the downlink control channel of the at least one terminal device is mapped in a first control region within a bandwidth of a system in a manner of mapping in a frequency domain and then in a time domain; and
   sending the downlink control channel of the at least one terminal device through the time-frequency resource for the downlink control channel of the at least one terminal device;
   wherein determining the time-frequency resource for the downlink control channel of the at least one terminal device comprises:
   determining a Control Channel Element (CCE) resource corresponding to at least one control channel candidate of a specific terminal device in the at least one terminal device in the first control region according to at least one of: a Radio Network Temporary Identity (RNTI) of the specific terminal device, a present time-domain scheduling unit number, a carrier frequency number, or a CCE Aggregation Level (AL);
   responsive to that the CCE resource corresponding to the first control channel candidate is not allocated, allocating the CCE resource corresponding to the first control channel candidate to the specific terminal device; and responsive to that the CCE resource corresponding to the first control channel candidate has been allocated, allocating an unallocated CCE resource corresponding to a next control channel candidate to the specific terminal device; and after CCE resource allocation for the at least one terminal device is completed, mapping a CCE resource in the first control region in the manner of mapping in the frequency domain and then in the time domain to obtain the time-frequency resource for the downlink control channel of the at least one terminal device.

2. The method of claim 1, further comprising:
sending control region configuration information to the at least one terminal device, wherein the control region configuration information indicates a configuration of the first control region.

3. The method of claim 1, further comprising:
sending configuration information of a first search space to a specific terminal device in the at least one terminal device, wherein the configuration information of the first search space indicates an OFDM symbol where the time-frequency resource for the downlink control channel of the specific terminal device is located.

4. The method of claim 1, wherein sending the downlink control channel of the at least one terminal device through the time-frequency resource for the downlink control channel of the at least one terminal device comprises:
sending the downlink control channel of the at least one terminal device by beamforming on at least one OFDM symbol in the first control region through the time-frequency resource for the downlink control channel of the at least one terminal device.

5. The method of claim 1, wherein an OFDM symbol in the first control region is associated with a beam number, and the time-frequency resource for the downlink control channel corresponding to a specific beam number is located on an OFDM symbol associated with the specific beam number.

6. The method of claim 5, further comprising:
sending configuration information of a second search space to the at least one terminal device, wherein the configuration information of the second search space indicates the OFDM symbol associated with the beam number.

7. A method for transmitting information, comprising:
receiving configuration information from a network device, wherein the configuration information indicates a configuration of a first control region corresponding to a terminal device within a bandwidth of a system; and
detecting a downlink control channel of the terminal device in the first control region according to the configuration information
wherein detecting the downlink control channel of the terminal device in the first control region according to the configuration information comprises:
determining the first control region and a mapping manner for the first control region according to the configuration information;
determining a Control Channel Element (CCE) resource corresponding to at least one control channel candidate of the terminal device in the first control region according to at least one of: a Radio Network Temporary Identity (RNTI) of the terminal device, a present time-domain scheduling unit number, a carrier frequency number, or a CCE Aggregation Level (AL);
and detecting the downlink control channel of the terminal device according to the CCE resource corresponding to the at least one control channel candidate and the mapping manner.

8. The method of claim 7, wherein the mapping manner for the first control region is a manner of mapping in a frequency domain and then in a time domain, and the first control region comprises one or more Orthogonal Frequency Division Multiplexing (OFDM) symbols.

9. The method of claim 7, wherein the mapping manner for the first control region is a manner of mapping in a frequency domain and then in a time domain, and the first control region comprises one or more Orthogonal Frequency Division Multiplexing (OFDM) symbols.

10. A network device, comprising:
a processor, configured to determine a time-frequency resource for a downlink control channel of at least one terminal device, wherein the time-frequency resource for the downlink control channel of the at least one terminal device is mapped in a first control region within a bandwidth of a system in a manner of mapping in a frequency domain and then in a time domain; and
a network interface, configured to send the downlink control channel of the at least one terminal device through the time-frequency resource for the downlink control channel of the at least one terminal device;
wherein the processor is configured to:
determine a Control Channel Element (CCE) resource corresponding to at least one control channel candidate of a specific terminal device in the at least one terminal device in the first control region according to at least one of: a Radio Network Temporary Identity (RNTI) of the specific terminal device, a present time-domain scheduling unit number, a carrier frequency number, or a CCE Aggregation Level (AL);
responsive to that the CCE resource corresponding to the first control channel candidate is not allocated, allocate the CCE resource corresponding to the first control channel candidate to the specific terminal device; and
responsive to that the CCE resource corresponding to the first control channel candidate has been allocated, allocate an unallocated CCE resource corresponding to a next control channel candidate to the specific terminal device; and
after CCE resource allocation for the at least one terminal device is completed, map a CCE resource in the first control region according to the manner of mapping in the frequency domain and then in the time domain to obtain the time-frequency resource for the downlink control channel of the at least one terminal device.

11. The network device of claim 10, wherein the manner of mapping in the frequency domain and then in the time domain comprises:
mapping a first Orthogonal Frequency Division Multiplexing (OFDM) symbol in the first control region along the frequency domain, and then mapping a next OFDM symbol in the first control region.

12. The network device of claim 10, wherein a CCE resource corresponding to a control channel candidate is continuous on the frequency domain.

13. The network device of claim 10, wherein the network interface is further configured to send control region configuration information to the at least one terminal device, wherein the control region configuration information is for indicating a configuration of the first control region.

14. The network device of claim 10, wherein the network interface is further configured to send configuration information of a first search space to a specific terminal device in the at least one terminal device, wherein the configuration information of the first search space is for indicating an OFDM symbol where the time-frequency resource for the downlink control channel of the specific terminal device is located.

15. The network device of claim 10, wherein an OFDM symbol in the first control region is associated with a beam number, and the time-frequency resource for the downlink control channel corresponding to a specific beam number is located on an OFDM symbol associated with the specific beam number.

16. The network device of claim 15, wherein the network interface is further configured to send configuration information of a second search space to the at least one terminal device, wherein the configuration information of the second search space is for indicating OFDM symbol associated with the beam number.

17. The network device of claim 10, wherein the network interface is specifically configured to send the downlink control channel of the at least one terminal device by beamforming on at least one OFDM symbol in the first control region through the time- frequency resource for the downlink control channel of the at least one terminal device.

18. A terminal device, comprising:
a network interface, configured to receive configuration information sent by a network device, wherein the configuration information is for indicating a configuration of a first control region corresponding to the terminal device within a bandwidth of a system; and
a processor, configured to detect a downlink control channel of the terminal device in the first control region according to the configuration information;
wherein the processor is specifically configured to:
determine the first control region and a mapping manner for the first control region according to the configuration information;
determine a Control Channel Element (CCE) resource corresponding to at least one control channel candidate of the terminal device in the first control region according to at least one of: a Radio Network Temporary Identity (RNTI) of the terminal device, a present time-domain scheduling unit number, a carrier frequency number, or a CCE Aggregation Level (AL); and
detect the downlink control channel of the terminal device according to the CCE resource corresponding to the at least one control channel candidate and the mapping manner.

19. The terminal device of claim 18, wherein the mapping manner for the first control region is a manner of mapping in a frequency domain and then in a time domain, and the first control region comprises one or more Orthogonal Frequency Division Multiplexing (OFDM) symbols.

20. The terminal device of claim 18, wherein the mapping manner for the first control region is a manner of mapping in a time domain first and then in a frequency domain, and the first control region comprises multiple OFDM symbols.

\* \* \* \* \*